(12) United States Patent
Yoshida et al.

(10) Patent No.: US 9,261,412 B2
(45) Date of Patent: Feb. 16, 2016

(54) TEMPERATURE SENSOR

(75) Inventors: Haruhiko Yoshida, Shizuoka (JP);
Kazuyuki Matsunaga, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/263,010

(22) PCT Filed: Jun. 8, 2010

(86) PCT No.: PCT/JP2010/059994
§ 371 (c)(1),
(2), (4) Date: Oct. 5, 2011

(87) PCT Pub. No.: WO2010/143729
PCT Pub. Date: Dec. 16, 2010

(65) Prior Publication Data
US 2012/0031517 A1 Feb. 9, 2012

(30) Foreign Application Priority Data
Jun. 8, 2009 (JP) ................................. 2009-137202

(51) Int. Cl.
*G01K 1/14* (2006.01)
*G01K 13/02* (2006.01)

(52) U.S. Cl.
CPC . *G01K 1/14* (2013.01); *G01K 13/02* (2013.01)
USPC .......... 374/163; 374/208; 374/185; 73/866.5; 338/275

(58) Field of Classification Search
CPC ............ G01K 1/14; G01K 1/08; G01K 1/16; G01K 1/00
USPC ................. 374/100, 208, 179, 185, 141, 163, 374/144–146; 338/275, 276, 226; 138/103; 73/866.1, 866.5
See application file for complete search history.

(56) References Cited

U.S. PATENT DOCUMENTS

| | | | | |
|---|---|---|---|---|
| 3,309,237 A | * | 3/1967 | Kelchner et al. | 136/221 |
| 4,420,738 A | * | 12/1983 | Rehmann et al. | 338/28 |
| 5,632,557 A | * | 5/1997 | Simons | 374/148 |

(Continued)

FOREIGN PATENT DOCUMENTS

| | | | |
|---|---|---|---|
| JP | 2006-250763 A | | 9/2006 |
| JP | 2006308330 A | * | 11/2006 |
| WO | 2007/134564 A1 | | 11/2007 |

OTHER PUBLICATIONS

International Search Report (PCT/ISA/210) issued on Sep. 29, 2010 in the International Patent Application No. PCT/JP2010/059994.

(Continued)

*Primary Examiner* — Gail Kaplan Verbitsky
(74) *Attorney, Agent, or Firm* — Sughrue Mion, PLLC

(57) ABSTRACT

A temperature sensor includes a clamp and a thermistor. The clamp is adapted to be inserted into an opening formed in an object, and has a shaft member. A flange member is extended from the shaft member in a direction orthogonal to an inserting direction in which the clamp is inserted into the opening. An engaging member extended from an end part of the shaft member toward the flange member in a direction inclined with the inserting direction. The thermistor is provided in the shaft member and is disposed in the end part. The engaging member and the flange member are adapted to clamp the object therebetween when the clamp is inserted into the opening.

7 Claims, 5 Drawing Sheets

(56) References Cited

U.S. PATENT DOCUMENTS

| | | | |
|---|---|---|---|
| 5,749,656 A * | 5/1998 | Boehm et al. | 374/185 |
| 5,764,130 A * | 6/1998 | Straub et al. | 338/28 |
| 5,844,135 A * | 12/1998 | Brammer et al. | 73/202.5 |
| 6,082,895 A * | 7/2000 | Janicek | 374/185 |
| 6,151,974 A * | 11/2000 | Acht et al. | 73/866.5 |
| 6,334,707 B1 * | 1/2002 | Ku | 374/208 |
| 6,367,974 B1 * | 4/2002 | Lin | 374/179 |
| 6,389,909 B1 * | 5/2002 | Johnson et al. | 73/861.78 |
| 6,435,017 B1 * | 8/2002 | Nowick et al. | 73/114.68 |
| 6,588,931 B2 * | 7/2003 | Betzner et al. | 374/185 |
| 6,918,696 B2 * | 7/2005 | Hoshisashi et al. | 374/208 |
| 7,004,042 B2 * | 2/2006 | Grundmann et al. | 73/866.5 |
| 7,134,170 B2 * | 11/2006 | Gibbons et al. | 24/289 |
| 7,147,369 B2 * | 12/2006 | Gadonniex | G01K 1/16 374/185 |
| 7,153,024 B2 * | 12/2006 | Usui | 374/208 |
| 7,216,546 B2 * | 5/2007 | Hayashi et al. | 73/708 |
| 7,259,383 B2 * | 8/2007 | Wirthlin | 250/573 |
| 7,410,294 B2 * | 8/2008 | Shiraki et al. | 374/208 |
| 7,607,316 B2 * | 10/2009 | Park et al. | 62/298 |
| 7,824,101 B2 * | 11/2010 | Kloiber et al. | 374/147 |
| 8,806,937 B2 * | 8/2014 | Hatano | 73/431 |
| 2004/0081225 A1 * | 4/2004 | Janicek | 374/185 |
| 2005/0155442 A1 | 7/2005 | Grundmann et al. | |
| 2006/0164203 A1 * | 7/2006 | Mast et al. | 338/68 |
| 2006/0196954 A1 * | 9/2006 | Okuda et al. | 236/49.3 |
| 2007/0110124 A1 * | 5/2007 | Shiraki et al. | 374/208 |
| 2009/0133449 A1 | 5/2009 | Bard et al. | |

OTHER PUBLICATIONS

Office Action dated Sep. 22, 2013 issued by the Patent Office of the People's Republic of China in counterpart Chinese Patent Application No. 201080025244.5.

Office Action dated Oct. 8, 2013 issued by the Japanese Patent Office in counterpart Japanese Patent Application No. 2009-137202.

Office Action dated Jan. 27, 2014 issued by the State Intellectual Property of P.R. China in corresponding Chinese Application No. 201080025244.5.

Office Action dated Jul. 3, 2014 issued by the Patent Office of the People's Republic of China in counterpart Chinese Patent Application No. 201080025244.5.

Communication issued on Oct. 14, 2015 by The State Intellectual Property Office of the PR of China in related Application No. 201080025244.5.

* cited by examiner

TEMPERATURE SENSOR

TECHNICAL FIELD

The present invention relates to a temperature sensor used for a motor vehicle, and more particularly to a temperature sensor that can be simply attached to an air duct for supplying air to forcedly air cool a battery pack mounted on an electric motor vehicle or a hybrid motor vehicle.

BACKGROUND ART

On the electric motor vehicle or the hybrid motor vehicle, a battery is mounted for supplying an electric power to an electric motor and converting a kinetic energy to an electric energy during a regenerative braking operation and storing the electric energy. As the battery, a secondary battery or a double layer capacitor is employed. Such a battery is formed as a battery module having cells laminated, and the battery module accommodated in a casing is mounted on the vehicle. The casing, the battery module accommodated in the casing and other components are called a battery pack. The battery module generates heat in accordance with an electrochemical reaction in an inner part, so that its temperature rises. When the temperature is high, since the power generation efficiency of the battery module is deteriorated, cooling air is ordinarily forcibly introduced to an air duct from outside to cool the battery module.

In order to control an air supply, the temperature of the air duct needs to be measured. Accordingly, a temperature sensor is attached thereto to measure the temperature. As a method for attaching a temperature sensor to an air duct, a fixing example of a temperature sensor disclosed in PTL 1 is proposed.

FIGS. 4A and 4B are a diagram showing an attaching example of the temperature sensor disclosed in the PTL 1. In FIGS. 4A and 4B, reference numeral 30 designates a housing, 30B designates a housing main body part, 30C designates a clip, 30V designates a thermistor accommodating part, TS designates a thermistor, TT designates a thermistor terminal, TL designates a thermistor lead wire, TW designates thermistor signal line and TJ designates a part filled with the hot melt resin.

As shown in FIGS. 4A and 4B, the housing 30 formed with a resin includes the housing main body part 30B in which the element accommodating part 30V for accommodating the thermistor element TS is formed. In an outer side surface of the main body part 30B, the anchor type clip 30C is formed.

Accordingly, the clip 30C is attached to an attaching hole formed in a fixing side so that the housing 30 may be fixed to the fixing side by one touch.

FIGS. 5A and 5B are an attaching example of a temperature sensor of a conventional temperature sensor. In FIGS. 5A and 5B, the grommet 41 has a large flange 41F formed in an outer periphery in the axial direction and a swelling part 41T formed in an end part of a rear part thereof with respect to an inserting direction in which the grommet 41 is inserted, so that a compressed flat part 41H is formed between the flange and the swelling part and the tie wrap 42 is fastened thereto. On the other hand, in a front part with respect to the inserting direction of the flange 41F, a swelling part 41R is formed so that a hole of an attaching plate B is fitted to a part between the flange 41F and the swelling part 41R. An end 41G is thinner than the swelling part 41R so as to be easily inserted into the hole of the attaching plate B.

The grommet 41 has a through hole 41A formed in a central part in the axial direction. A thermistor TS is accommodated in the through hole 41A.

Accordingly, after the grommet 41 is inserted into the attaching hole of the attaching plate B to allow the grommet 41 to abut on the flange 41F, the tie wrap 42 is wrapped on the upper compressed flat part 41H and an end of the tie wrap 42 is inserted into a hole 42K of a tie wrap head 42H and strongly pulled. Thus, the thermistor TS is not slipped off from the grommet 41 and is fixed to the attaching plate B. A surplus part pulled out from the tie wrap head 42H is cut so as not to interfere with the tie wrap head.

In such a way, the attachment is carried out as shown in FIGS. 5A and 5B.

CITATION LIST

Patent Literature
[PTL 1] JP-A-2006-250763

SUMMARY OF INVENTION

Technical Problem

The attaching method for the temperature sensor disclosed in the PTL 1 has below-described disadvantages. Namely, since a clamp is integrally formed in the side of the temperature sensor, the dimension of a product is disadvantageously increased. After the thermistor is inserted, the housing is filled with the hot melt resin, so that the number of manufacturing processes is disadvantageously increased to increase a cost. Only the temperature of a side to which the clamp is attached may be measured. Namely, when the clamp is not attached toward an outside from a tubular inner part of the duct or the like, the temperature in the duct cannot be measured. Further, a work for attaching the clamp toward the outside from the tubular inner part of the duct is considerably troublesome and difficult.

The attaching method for the temperature sensor of the conventional temperature sensor as shown in FIGS. 5A and 5B has below-described disadvantages. Namely, the grommet or the tie wrap as separate parts disadvantageously needs to be prepared to hold a sensor main body. When the sensor main body is attached, after the grommet is attached to the attaching plate, the sensor main body is fixed to the attaching plate by the tie wrap. However, since a spring mechanism serving to press the sensor main body to the attaching plate is not provided, an air-tightness is insufficiently ensured. A fastening force is more insufficient than that of a screw fastening method which is a main attaching method for an ordinary temperature sensor.

Solution to Problem

It is therefore one advantageous aspect of the present invention is to provide a temperature sensor in which the dimension of a product is not increased, the number of manufacturing processes can be reduced to decrease a cost, a clamp can be attached from outside a tubular part such as a duct, a temperature can be measured at angles of 360° in all directions, separate parts for holding a sensor main body are not necessary and the sensor main body can be assuredly pressed and fixed to an attaching plate without an inferiority to a screw fastening method so that an air-tightness is sufficiently ensured.

According to one aspect of the invention, there is provided a temperature sensor, comprising:

a clamp, configured to be inserted into an opening formed in an object, and having a shaft member;

a flange member extended from the shaft member in a direction orthogonal to an inserting direction in which the clamp is inserted into the opening;

an engaging member extended from an end part of the shaft member toward the flange member in a direction inclined with the inserting direction; and a thermistor provided in the shaft member and disposed in the end part, wherein the engaging member and the flange member are configured to clamp the object therebetween when the clamp is inserted into the opening.

The temperature sensor may be configured such that the clamp and the thermistor are formed by insert molding.

The temperature sensor may be configured such that: a end portion of the engaging member is formed with a notch, and the notch is configured to be engaged with an edge of the opening.

The temperature sensor may be configured such that: a peripheral portion of the flange member is curved in the inserting direction, and the peripheral portion and the notch are configured to clamp the object therebetween.

The temperature sensor may be configured such that the engaging member has elasticity.

According to another aspect of the invention, there is provided an air duct for supplying air to a battery pack for a motor vehicle, the battery pack accommodating a battery module consisting of laminated battery cells in a casing, the air duct arranged closely to the battery pack to forcibly air-cool the battery pack, the air duct comprising the temperature sensor, wherein the temperature sensor is attached to an opening formed in the air duct.

Advantageous Effects of Invention

By the above configuration, since the clamp of the temperature sensor is merely inserted into the opening of the air duct, the temperature sensor may be simply attached to the air duct from outside. Thus, separate parts are not necessary to hold a sensor main body and the temperature sensor can be assuredly fixed to the air duct without the leakage of air. Further, under a state that the temperature sensor is attached to the air duct, temperature at angles of 360° in all directions can be measured.

DESCRIPTION OF EMBODIMENTS

Exemplified embodiments of the invention will be described below in detail with reference the accompanying drawings.

The temperature sensor 100 according to the present invention includes an clamp 10, a thermistor element TS insert molded therein, a terminal TT thereof (shown in FIG. 2C) and a lead wire TL connected to the terminal TT to take outside a temperature signal.

Figures 1A, 1B:
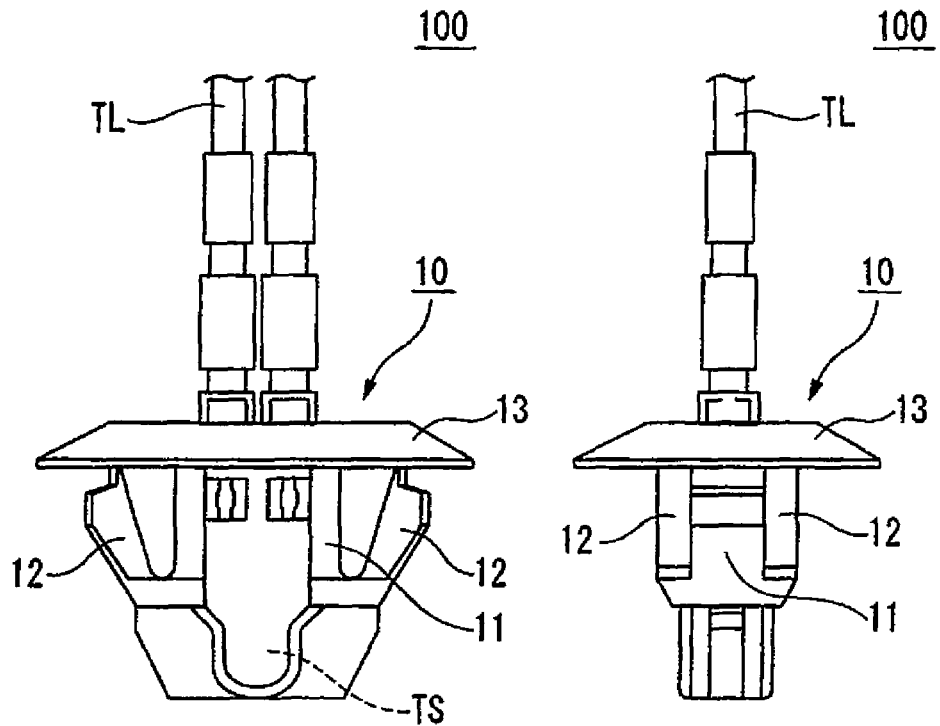
FIG. 1A is a front view of a temperature sensor according to one embodiment of the present invention.
FIG. 1B is a side view of the temperature sensor shown in FIG. 1A.
Figure 1C:
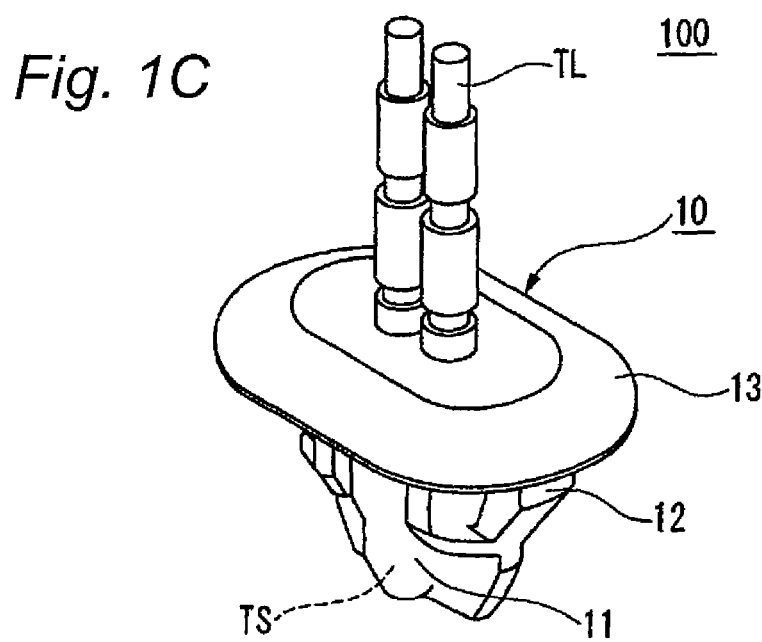
FIG. 1C is a perspective view of the temperature sensor shown in FIG. 1A.

In FIGS. 1A to 1C, the clamp 10 includes a shaft member 11, an engaging member 12 standing obliquely rearward from a part in the vicinity of an end of the shaft member 11 and a cap part 13 standing at right angles to the shaft member 11 in a rear end of the shaft member 11.

Now, the shaft member 11, the engaging member 12 and the cap part 13 will be described below by referring to FIG. 2C.

The shaft member 11 has a cylindrical, elliptic or square post shape. The shaft member 11 has a thickness (diameter) formed to be smaller than an attaching hole Bh (shown in FIG. 2A) opened in an attaching plate (a case plate of an air duct) B so as to be inserted into the attaching hole Bh. The shaft member 1 has a length formed to be sufficiently longer than the thickness of the attaching plate B.

The thermistor element TS and the terminal TT are embedded in an axial end of the shaft member 11 of the clamp 10, and the lead wire TL is embedded in a rear part from the terminal TT. Since the clamp and the thermistor element TS are integrally formed, the temperature sensor can be formed to be compact and the number of manufacturing processes can be reduced. The thermistor element TS or the like may be embedded by an insert molding method.

In the engaging member 12, obliquely standing cantilever arms 12A which expand so as to be separated from the shaft member 11 as the cantilever arms are extended rearward in the axial direction from the part in the vicinity of the end of the shaft member 11 respectively stand obliquely from a plurality of parts in the circumferential direction of the shaft member 11. In other words, the cantilever arms 12A are extended from the part in the vicinity of the end of the shaft member toward the cap member 13 in a direction inclined with an inserting direction in which the clamp 10 is inserted into the attaching hole Bh. Further, at an end of the cantilever arm 12A, a right-angled notch 12C is formed. Since the cantilever arm 12A has an elasticity of a material, when the end is pressed toward the shaft member 11, the cantilever arm is bent toward the shaft member 11. When there is no pressure to the cantilever arm, a restoring force acts so that the cantilever arm returns to its original form.

The cap part 13 includes a standing part 13V having flange shape standing from all the circumference of 360° of the shaft member 11 at right angles to the axial direction from the rear end of the shaft member 11 and a curved part 13C curved slightly forward (the inserting direction) over an entire peripheral edge in the vicinity of an end of the standing part 13V.

An axial gap is formed between the notches 12C of the engaging member 12 and the curved part 13C at the end of the cap part 13 and the gap corresponds to the thickness of the case plate B of the air duct to be inserted.

Figure 2A:
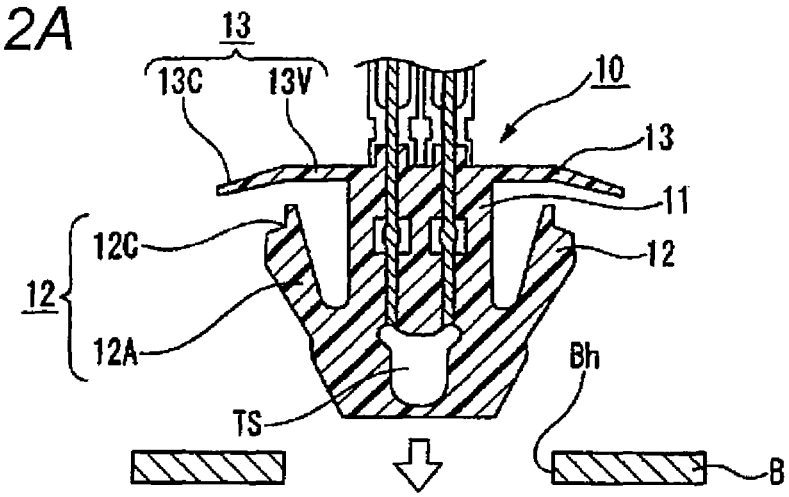
FIGS. 2A to 2C are diagrams for explaining an attaching method for attaching a clamp of the temperature sensor shown in FIG. 1A to a case plate of an air duct.
Figure 2B:
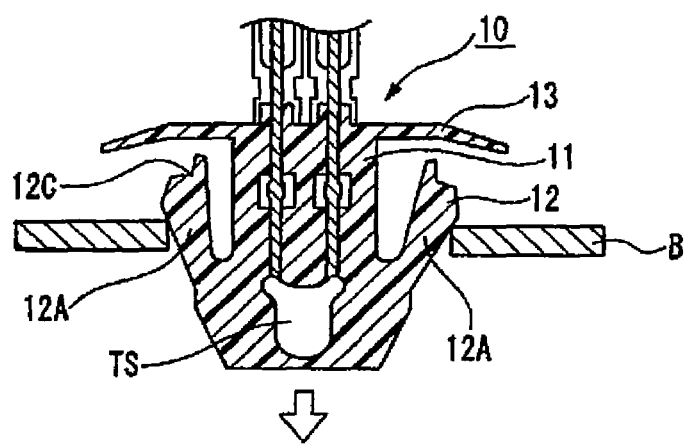
Figure 2C:
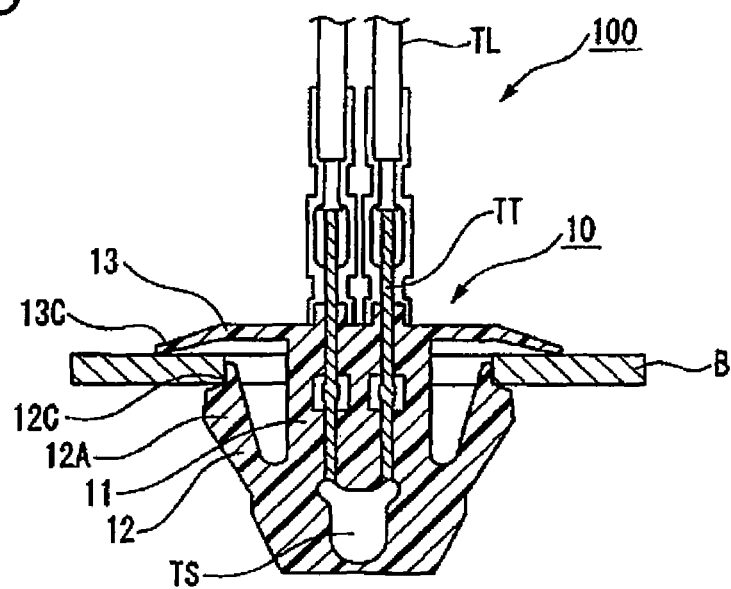

The clamp is attached to the case plate in order of FIG. 2A to FIG. 2C.

In FIG. 2A, in order to attach the clamp 10 having the thermistor element TS incorporated to the case plate B of the air duct, the clamp 10 is allowed to come close to the attaching hole Bh of the case plate B and its end part is inserted into the attaching hole Bh.

In FIG. 2B, when the end part of the clamp 10 is inserted into the attaching hole Bh, the engaging member 12 abuts on the edge part of the attaching hole Bh, is bent inward due to the elasticity of the material and moves forward in the attaching hole Bh.

In FIG. 2C, when the end part of the clamp 10 passes through the attaching hole Bh, the bent engaging member 12 returns to its original position due to the restoring force. The notches 12C of the engaging member 12 are engaged with the edge part of the attaching hole Bh of the case plate B so that the engaging member 12 is not slipped off from the case plate and is fixed thereto. At the same time, the curved part 13C at the end of the cap part 13 abuts on the case plate B and is slightly bent due to the elasticity of the cap part 13 to prevent a further insertion of the clamp 10. Under this state, the case plate B is sandwiched between the notches 12C of the engaging member 12 and the curved part 13C at the end of the cap part 13 and firmly fixed. Thus, the attaching hole Bh is closed by the cap part 13 so that the leakage of air from the attaching hole Bh is prevented.

Advantages of attaching method according to the present invention are: since the thermistor element is embedded in the clamp, the temperature sensor is made to be compact; since the clamp and the thermistor element are integrally formed by an insert molding method, the number of manufacturing processes can be reduced to decrease a cost; since the clamp of the present invention can be attached from outside the air duct (a tubular form) in view of its form and structure, an attachment to the tubular form is easily carried out; since the engaging member and the cap part of the clamp come into close contact with the attaching plate, the leakage of air from an air intake duct can be prevented; since the clamp and the thermistor element are integrally formed, the number of parts is reduced; and since the thermistor element is embedded in the clamp, only the clamp is simply inserted into the attaching hole to finish a fixing operation.

As described above, according to the attachment of the temperature sensor of the present invention, the dimension of a product is not increased, the number of the manufacturing processes can be reduced, the clamp can be simply attached from outside a tubular part, a temperature can be measured at angles of 360° in all directions under an attached state, separate parts for holding a sensor main body are not necessary and the sensor main body can be assuredly fixed to the attaching plate.

As described above, recently, the temperature sensor is occasionally attached to the air duct in the vicinity of the battery pack for the motor vehicle. In the case of the temperature sensor disclosed in the PTL 1, since the clamp is attached from inside the air duct in view of a structure, an attaching work is difficult. However, when the temperature sensor according to the present invention is used, as shown in FIG. 3, since the clamp may be merely inserted into the attaching hole from outside the air duct, a work is exceptionally simple.

Figure 3:
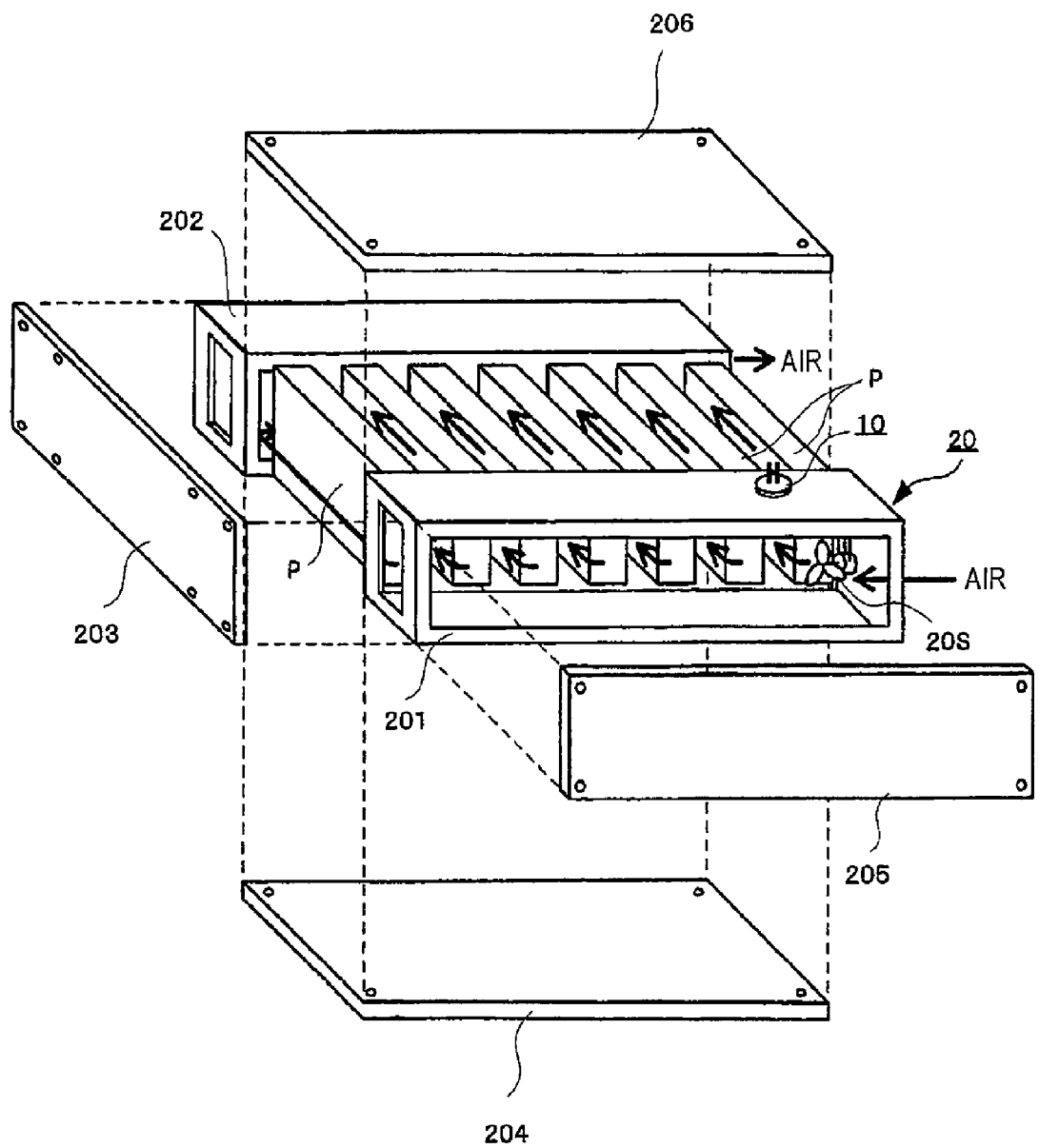
FIG. 3 is a perspective view of an air duct in which the temperature sensor shown in FIG. 1A is fixed.
Figure 4A:
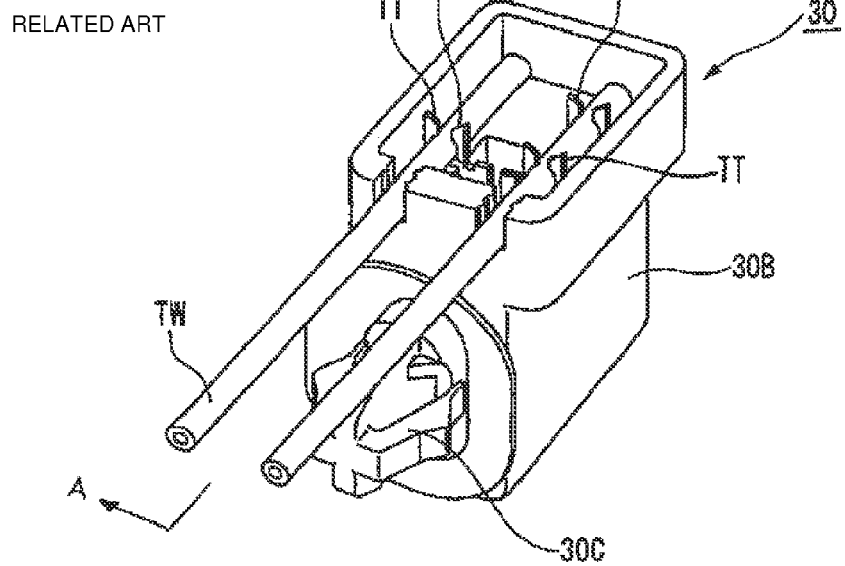
FIG. 4A is a perspective view of the temperature sensor shown in PTL 1 showing a state before a hot melt resin is filled.
Figure 4B:
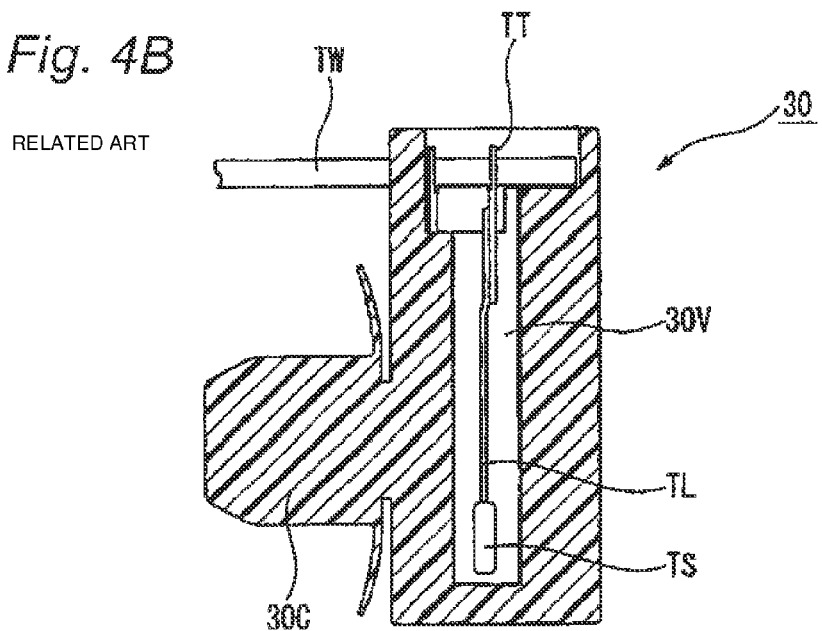
FIG. 4B is a sectional view taken along a line A-A' in FIG. 4A after the hot melt resin is filled.
Figure 5A:
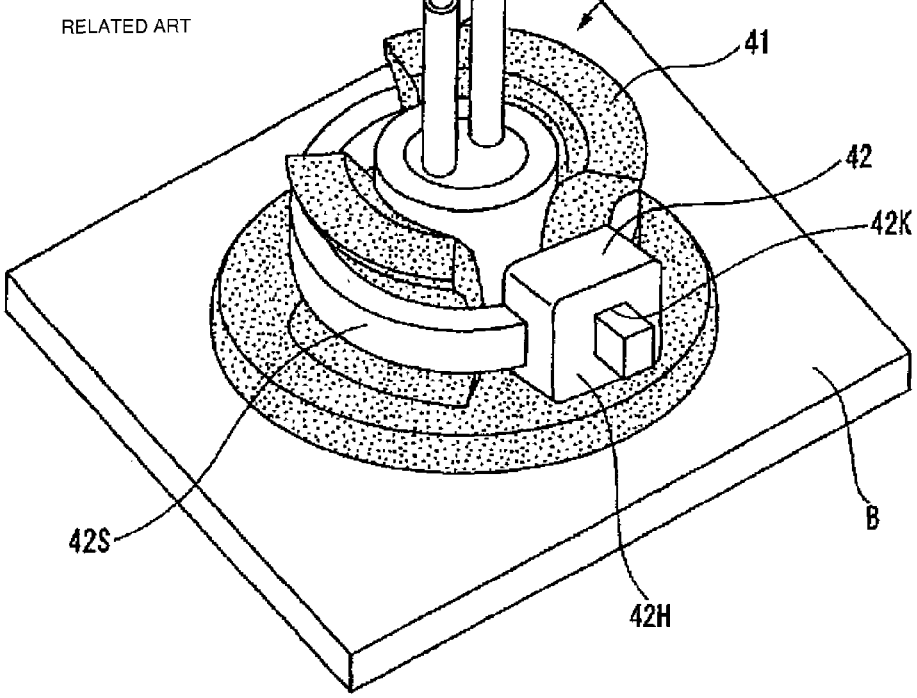
FIG. 5A is a perspective view of a conventional temperature sensor.
Figure 5B:
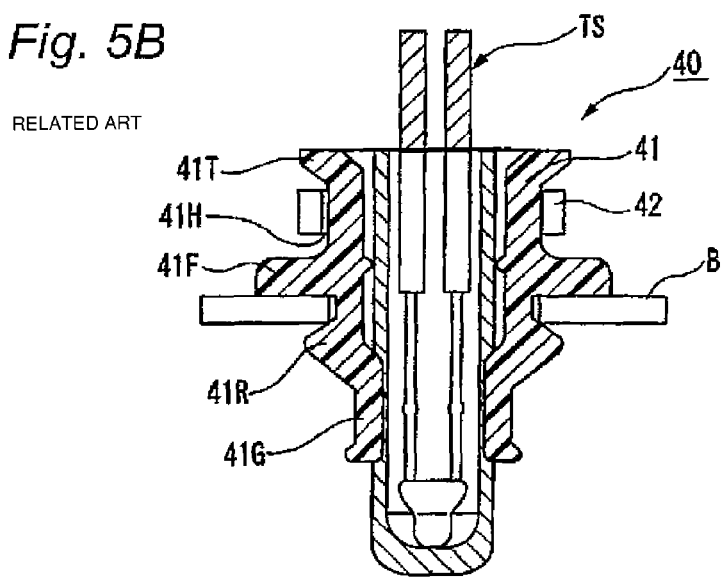
FIG. 5B is a longitudinally sectional view of the conventional temperature sensor shown in FIG. 5A.

In FIG. 3, many battery packs P for the motor vehicle are arranged in parallel. In the FIG. 3, seven battery packs P are provided. In order to forcibly air cool all the battery packs P for the motor vehicle, an air duct 201 for supplying air thereto is provided in a front part, and an air duct 202 for exhausting air that is supplied and heated after the battery packs P for the motor vehicle are cooled is provided in an opposite side thereto. A fan 20S is provided at an arbitrary position of paths in the air duct including the air ducts 201 and 202. In FIG. 3, the fan 20S is provided in the air duct 201. In FIG. 3, to easily understand an attaching relation between the air ducts and the battery packs P, duct plates 203 and 206 are removed and shown, however, all the duct plates are actually attached to the air duct. Since the attaching hole may be opened at any position of such an air duct 20 and the clamp of the temperature sensor 10 may be merely inserted into the attaching hole, the temperature sensor can be simply attached from outside and can measure temperature at angles of 360° in all directions under a state that the temperature sensor is attached to the air duct. Separate parts are not necessary to hold a sensor main body and the temperature sensor can be assuredly fixed to the air duct without the leakage of air.

As described above, when the temperature sensor according to the present invention is used, the temperature sensor can be simply attached from outside, the temperature at angles of 360° in all the directions can be measured, the separate parts are not necessary to hold the sensor main body and the temperature sensor can be assuredly fixed to the air duct without the leakage of air.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

The present invention is based on Japanese Patent Application No. 2009-137202 filed on Jun. 8, 2009, the contents of which are incorporated herein for reference.

INDUSTRIAL APPLICABILITY

The present invention is extremely useful in forming the temperature sensor that can be simply attached to the air duct for supplying air to forcedly air cool the battery pack mounted on the electric motor vehicle or the hybrid motor vehicle.

REFERENCE SIGNS LIST 100 temperature sensor
10 clamp
11 shaft member
12 engaging member
12A cantilever arm
12C notch
13 cap part
13C curved part
13V standing part
20 air duct
201 air duct of air supply side
202 air duct of air exhaust side
20S fan
203 to 206 duct plate
TS thermistor element
TT terminal
TL lead wire
B attaching plate
Bh attaching hole
P battery pack for motor vehicle

The invention claimed is:
1. A temperature sensor, comprising:
a clamp, configured to be inserted into an opening formed in an object, and having a shaft member;

a flange member extended from the shaft member in a direction orthogonal to an inserting direction in which the clamp is inserted into the opening;

an engaging member extended from a bottom end of the shaft member toward the flange member in a direction inclined with the inserting direction so that there is a space between the shaft member and an end of the engaging member nearest the flange member; and a thermistor disposed in the bottom end of the shaft member and embedded in the clamp, wherein the engaging member and the flange member are configured to clamp the object therebetween when the clamp is inserted into the opening, the flange member, the engaging member and the thermistor are integrally formed by an insert molding method, and the entire thermistor is surrounded and in physical contact with the shaft member, and the shaft member comprises two bores for thermistor wires.

2. The temperature sensor as set forth in claim 1, wherein:

an end portion of the engaging member is formed with a notch, and the notch is configured to be engaged with an edge of the opening.

3. The temperature sensor as set forth in claim 2, wherein:

a peripheral portion of the flange member is curved in the inserting direction, and the peripheral portion and the notch are configured to clamp the object therebetween.

4. The temperature sensor as set forth in claim 1, wherein:

the engaging member has elasticity.

5. An air duct for supplying air to a battery pack for a motor vehicle, the battery pack accommodating a battery module consisting of laminated battery cells in a casing, the air duct arranged closely to the battery pack to forcibly air-cool the battery pack, the air duct comprising:

the temperature sensor set forth in claim 1, wherein the temperature sensor is attached to an opening formed in the air duct.

6. The temperature sensor as set forth in claim 1, wherein the thermistor is disposed in the bottom end of the shaft member from which the engaging member extends.

7. The temperature sensor as set forth in claim 1, wherein the thermistor fixed within the clamp.

* * * * *